Figure 1:
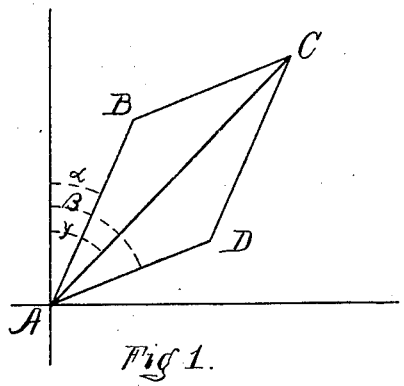

No. 628,358. Patented July 4, 1899.
H. A. ROWLAND.
METHOD OF AND APPARATUS FOR VARYING THE NUMBER OF PHASES OF POLYPHASE CURRENTS.
(Application filed July 16, 1894.)

(No Model.) 6 Sheets—Sheet 1.

Witnesses
Inventor
Henry A. Rowland,
by Whitman & Wilkinson,
Attorneys.

No. 628,358. Patented July 4, 1899.
H. A. ROWLAND.
METHOD OF AND APPARATUS FOR VARYING THE NUMBER OF PHASES OF POLYPHASE CURRENTS.
(Application filed July 16, 1894.)
(No Model.) 6 Sheets—Sheet 2.
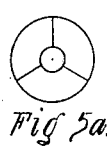   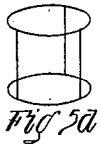 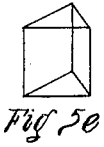
Fig. 5a. Fig. 5b. Fig. 5c. Fig. 5d. Fig. 5e.
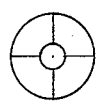 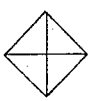 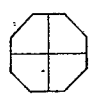 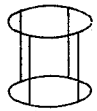 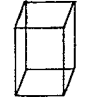
Fig. 5f. Fig. 5g. Fig. 5h. Fig. 5i. Fig. 5k.
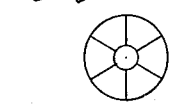 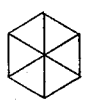 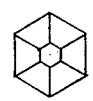 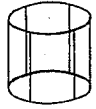
Fig. 5m. Fig. 5n. Fig. 5o. Fig. 5p.
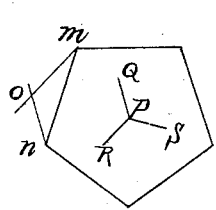 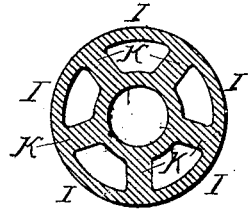 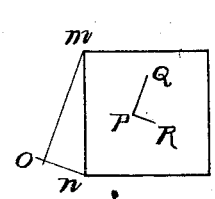
Fig. 6. Fig. 8. Fig. 7.
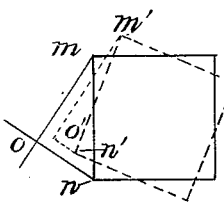 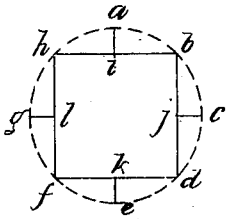 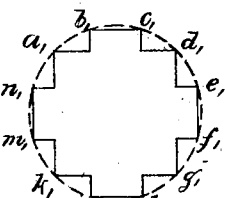
Fig. 9. Fig. 10. Fig. 11.
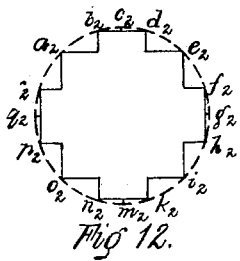 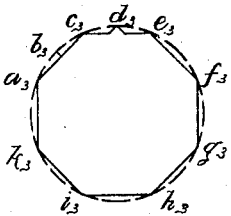
Fig. 12. Fig. 13.
Witnesses
S. N. Gillis.
M. J. Siusssa.
Inventor
Henry A. Rowland,
by Whitman & Wilkinson,
Attorneys
THE NORRIS PETERS CO., PHOTO-LITHO., WASHINGTON, D. C.

No. 628,358. Patented July 4, 1899.
H. A. ROWLAND.
METHOD OF AND APPARATUS FOR VARYING THE NUMBER OF PHASES OF POLYPHASE CURRENTS.
(Application filed July 16, 1894.)

(No Model.) 6 Sheets—Sheet 4.

No. 628,358. Patented July 4, 1899.
H. A. ROWLAND.
METHOD OF AND APPARATUS FOR VARYING THE NUMBER OF PHASES OF POLYPHASE CURRENTS.
(Application filed July 16, 1894.)
(No Model.) 6 Sheets—Sheet 5.

Witnesses
Inventor
Henry A. Rowland,
by Whitman & Wilkinson
Attorneys

No. 628,358. Patented July 4, 1899.
H. A. ROWLAND.
METHOD OF AND APPARATUS FOR VARYING THE NUMBER OF PHASES OF POLYPHASE CURRENTS.
(Application filed July 16, 1894.)
(No Model.) 6 Sheets—Sheet 6.
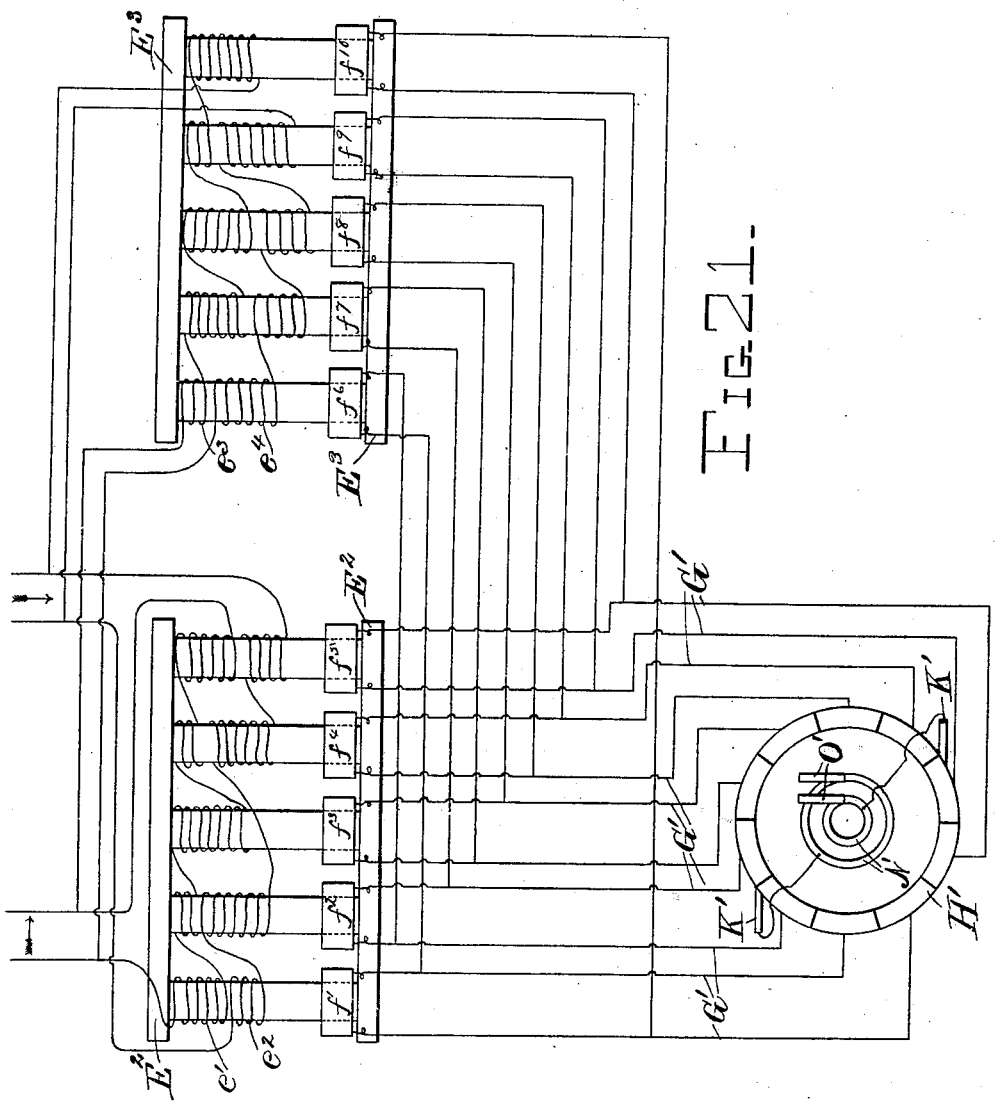
Witnesses
John ...
C. A. Bateman.
Inventor
Henry A. Rowland
by Wilkinson & Fisher
Attorneys.

UNITED STATES PATENT OFFICE.

HENRY A. ROWLAND, OF BALTIMORE, MARYLAND.

METHOD OF AND APPARATUS FOR VARYING THE NUMBER OF PHASES OF POLYPHASE CURRENTS.

SPECIFICATION forming part of Letters Patent No. 628,358, dated July 4, 1899.

Application filed July 16, 1894. Serial No. 517,726. (No model.)

*To all whom it may concern:*

Be it known that I, HENRY A. ROWLAND, a citizen of the United States, residing at Baltimore city, in the State of Maryland, have invented certain new and useful Improvements in Methods of and Apparatus for Varying the Number of Phases of Polyphase Currents; and I do hereby declare the following to be a full, clear, and exact description of the invention, such as will enable others skilled in the art to which it appertains to make and use the same.

My invention relates to methods of and apparatus for changing the number of phases of a polyphase current and changing the polyphase current into continuous current.

I prefer to use in describing the number of phases of a current the following system: Suppose a ring-armature to be wound with a continuous coil and to be revolving in a two-pole field. If it is tapped at three equidistant points, three-phase current will be obtained. If at four equidistant points, four-phase current will be obtained, and so on. It is thus evident that the expression "two-phase" current should, strictly speaking, be applied only to what is ordinarily known as "single-phase" current, while the ordinary biphase should more properly be spoken of as "four-phase."

To accomplish the transformation of currents of one system or number of phases to currents of another system, I prefer to use a "link-transformer," by which term I in this specification and in the claims thereto attached designate a transformer having two magnetic circuits, preferably, of course, through soft iron interlinked, so that at one point the two magnetic fluxes will flow through the same core and at other points they will be separate. I may wind both the parts of the core common to both circuits and the parts not common with coils, so proportioned that the number of phases of the secondary current will be different from the number of phases of the primary, as will be hereinafter more fully explained. By this means I am able to change any polyphase system into any alternating system whatever.

The use of a link-transformer is preferable to the use of a number of magnetically-disconnected transformers with coils wound over two cores, for the reason that the link-transformers superpose magnetic fluxes and not simply inductive effect and furnish a simple and complete entity, easily made and handled, mechanically strong, and electrically very simple.

When it is desired to change polyphase current into direct current, I have found it advisable to use a polyphase current of many phases, as the resulting direct current is then more uniform. My system of polyphase transformers is particularly applicable to such work, so that one feature of my invention resides in generating a polyphase current, transmitting it, transforming it into a polyphase current having a greater number of phases, and then transforming it into direct current.

Reference is had to the accompanying drawings, wherein the same parts are indicated by the same letters and numerals throughout the several views.

Figure 2:
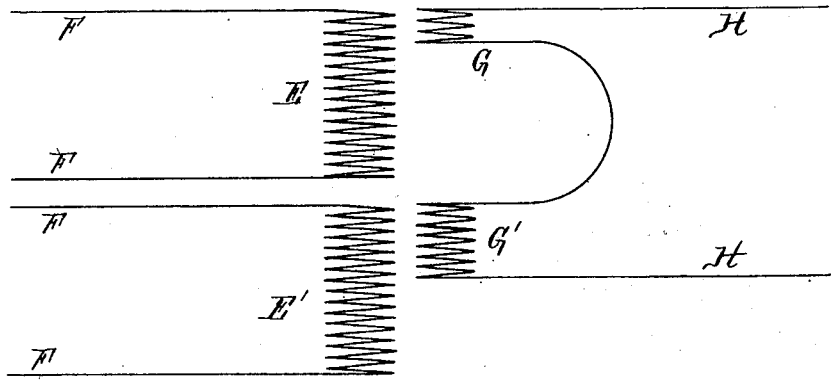
Figure 3:
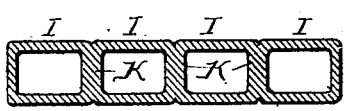
Figure 4:
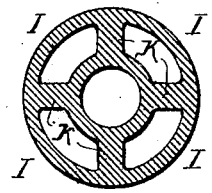
Figure 14:
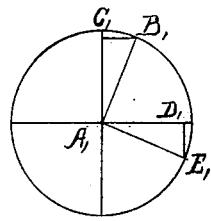
Figure 15:
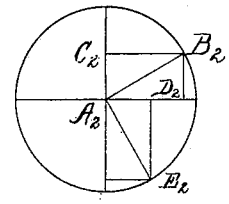
Figure 17:
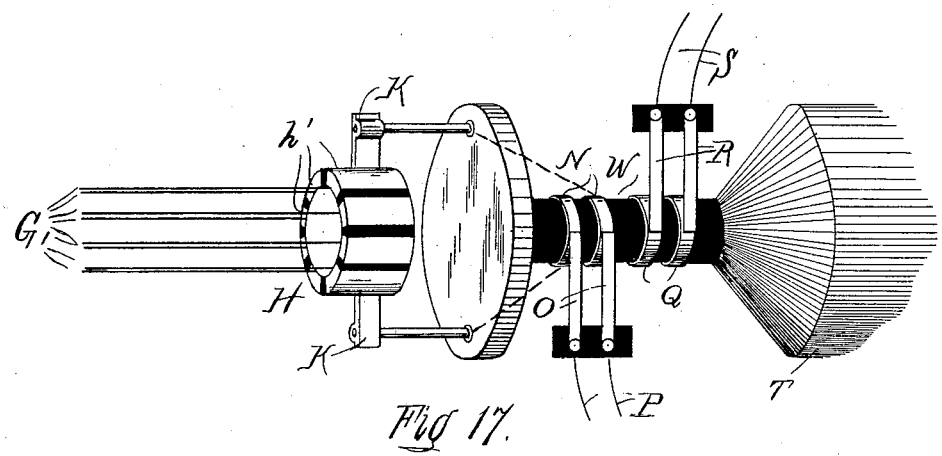
Figure 18:
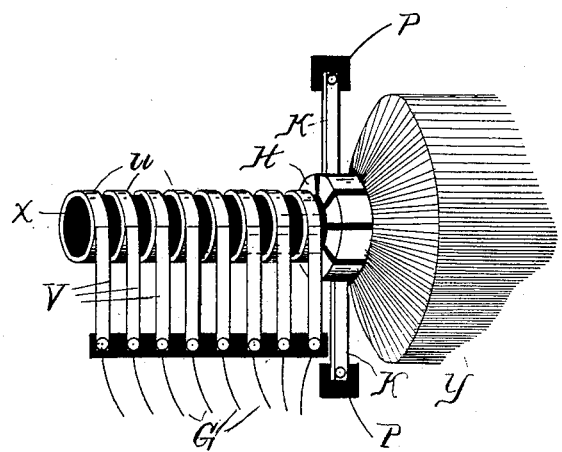
Figure 16:
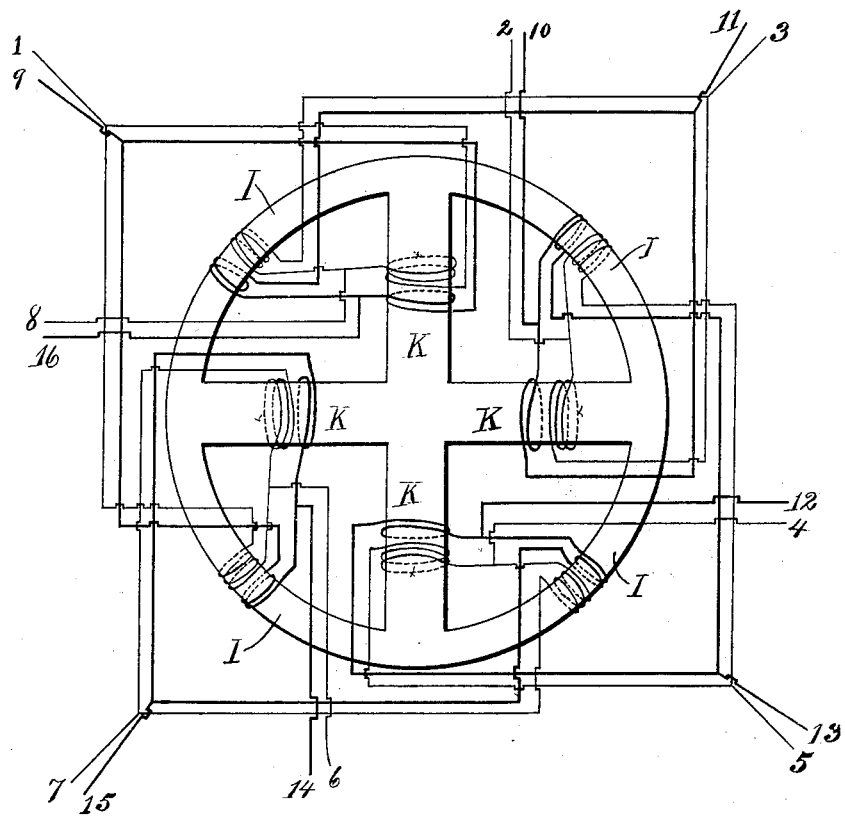
Figure 19:
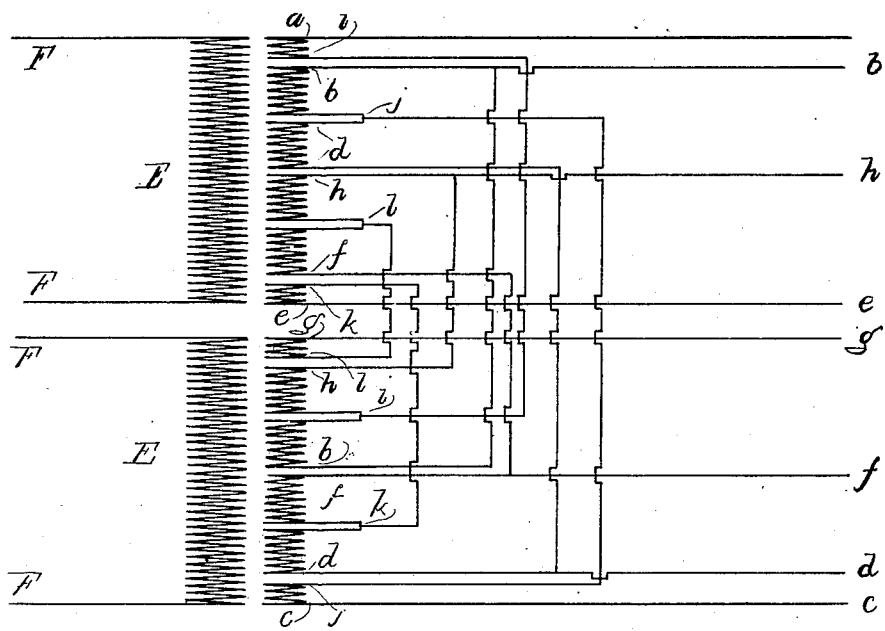
Figure 20:
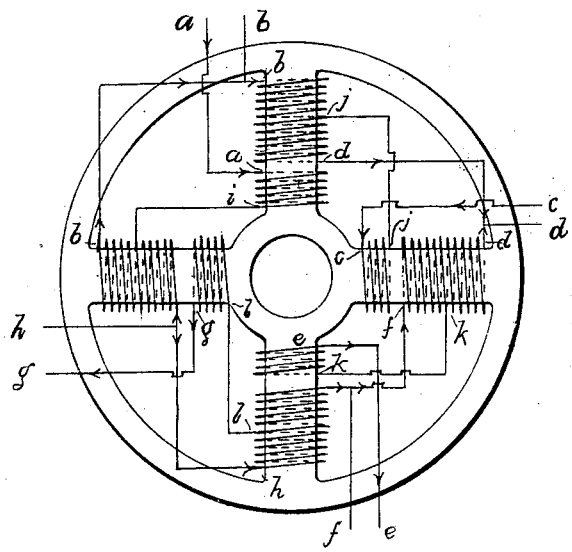

Figure 1 represents a graphic method of determining the resultant magnitude and phase of an electromotive force or a magnetomotive force produced by two currents differing in phase and of the same or different magnitudes when acting in series with each other. Fig. 2 shows a method of connecting the secondary cores of two transformers in open circuit to produce an eight-phase from a four-phase (ordinary two-phase) current. But two coils are shown, the rest being omitted for the sake of clearness in the diagram. Fig. 3 shows a section of the core of a link-transformer in which the links are placed together in such a manner that a part of the magnetic circuit of adjacent links is common to both. Fig. 4 shows a section of the core of a wheel form of such a four-link transformer, the spokes of which form a common part of the magnetic circuits of adjacent links. Figs. $5^a$ to $5^p$ show diagrammatically a variety of forms which may be given to link-transformers, the lines representing the elements of the magnetic circuits. Figs. $5^a$ to $5^e$ show three-link transformers. Figs. $5^f$ to $5^k$ show four-link transformers, and Figs. $5^m$ to $5^p$ show six-link transformers. Fig. 6 shows a graphic method of determining the proportions of the primary coils for a five-link transformer, in which three-phase current is changed to five-phase or to ten-phase. Fig. 7 shows a graphic method of determining the proportions of the primary coils of a four-link transformer from which four-phase or eight-phase current may be obtained, the primary current being four-phase. Fig. 8 shows a section of the core of a five-link transformer of the wheel form. Fig. 9 shows a graphic method of determining the proportions of the primary coils for two four-link transformers supplied by four-phase current when it is desired that the magnetic fluxes in the two transformers shall differ in phase, so that eight-phase current may be obtained from each of the transformers; but the two resulting eight-phase currents shall be dephased from each other. Fig. 10 shows a graphic method of determining the proportion of the secondary coils and a method of connecting them in order to obtain an eight-phase electromotive force from a four-link transformer. Fig. 11 shows a method of connecting the secondary coils of a transformer to obtain a twelve-phase electromotive force from a four-link transformer. Fig. 12 shows a method of connecting the secondary coils of a transformer to obtain a sixteen-phase electromotive force from a four-link transformer. Fig. 13 shows a method of connecting the secondary coils of a four-link transformer to obtain eight or sixteen phases. Figs. 14 and 15 show the method of determining the ratio of the windings of the secondary coils on each of the two four-link transformers in order that the phases of one will be midway between the phases produced by the other, and acting together they will produce a sixteen-phase electromotive force. Fig. 16 shows a closed-circuit method of winding primary and secondary coils for a four-link transformer, by which various combinations may be produced. Fig. 17 shows a method of revolving a pair of brushes synchronously over a fixed commutator. Fig. 18 shows a method of revolving a commutator synchronously, the brushes being fixed. Fig. 19 is a diagram of connections for deriving an eight-phase electromotive force from an ordinary two-phase current, here called a "four-phase" current. Fig. 20 shows a closed-coil method of connecting up the secondary coils of a four-link transformer, using the spokes only to obtain an eight-phase electromotive force and is the same as that shown diagrammatically in Fig. 10. Fig. 21 shows two transformers so connected as to generate in the secondary coils two sets of five-phase electromotive force, such that the series of phases produced by each of the transformers falls between those produced by the other, so as to form a single set of ten-phase electromotive forces.

In Fig. 1 let A B and A D represent in magnitude and phase two electromotive forces or two currents or two magnetomotive forces or magnetic fluxes, in fact, any two quantities whatever whose variations follow the same law, the lengths of the lines representing the magnitude of the quantities either maximum or effective on any convenient scale, and the angles $\alpha$ and $\beta$ representing their phase differences from some other sine function A Z assumed as a standard. Then it may be proved that A C will represent, if the two quantities be superposed, as by connecting two electromotive forces in series, the resultant sine function both in magnitude and phase, on the same scale and from the same standard of reference A Z. The magnitude of the resultant will be A C and its phase angle $\gamma$.

In Figs. 3, 4, 8, and 16, I I are elements of the magnetic circuits of a link-transformer and K K those parts which are common to two magnetic circuits. These links may obviously be wound in a number of different ways, and the methods of determining such windings for different cases will now be described.

Various methods of combining phases are possible. One is illustrated in Fig. 2, in which E and E' may be supposed to represent two coils wound on different cores and excited by equal currents of the phases $\beta$ and $\alpha$, respectively. The number of turns of the secondary coil G, wound on the same core with E, corresponds to the length of the line A D, while the number of turns of G', wound on the same core with E', corresponds to the length of A B. Neglecting transformer lag, which is not important where, as in this specification, only the relative phases of secondary currents are considered, the resultant electromotive force impressed on the wires H H will correspond in magnitude and phase with the line A C. This is the general principle on which the various forms of my invention are based; but it may be applied in many different ways.

In Fig. 6, P Q, P R, and P S represent the three currents of a three-phase system. It is desired to produce from them a five-phase system. Draw the pentagon, as shown, in any desired position with relation to lines P Q, &c. Then from any angle of the pentagon, as $m$, draw the line $m$ $o$ parallel with one of the lines of the three-phase current, as P R, and from $n$ draw $n$ $e$ parallel with another of the lines, as P Q. Then if $m$ $o$ be compounded with $o$ $n$ the result will be $m$ $n$. If now any five-link transformer, as the one shown in Fig. 8, have one of its arms wound with two coils whose number of turns is proportional to $m$ $o$ and $n$ $o$, respectively, and these two coils be connected to the proper terminals of the three-phase system—that is to say, the ones corresponding to P R and P Q—that particular arm will be the seat of a magnetic flux which in magnitude and phase corresponds to $m$ $n$. In the same way lines may be drawn from the other angles of the pentagon and the windings for the other arms found. It is thus evident that the five arms of the transformer will be the seat of five-phase magnetic fluxes, while the rims will also be the seat of five-phase magnetic fluxes displaced in phase, as the flux in each rim is the resultant of the fluxes in the two adjacent arms and is half-way between them in phase. Secondary coils may be wound on the rims or on the arms and will take off five-phase or ten-phase current of any desired voltage. In the same way the diagram of Fig. 7 may be applied to the transformer shown in Fig. 4 or to any of the transformers $5^f$ to $5^k$. Let P Q and P R represent the two currents in what is usually known as a "two-phase" system, though I prefer to call it a "four-phase," as it is evident that the phase displacement is one-quarter of a circle only. Draw the square as shown and from any two angles, as $m$ and $n$, draw lines parallel to the two lines P Q and P R. These lines meet at $o$. If now we place on one of the four links of the transformer two coils, one proportional to $m\,o$ and one to $n\,o$, and connect the coil proportional to $m\,o$ to the primary terminals corresponding to P Q and connect the coil proportional to $o\,n$ to the terminals corresponding to P R, the magnetomotive force in that particular link will correspond to $m\,n$. In the same way the other links may be wound to correspond with the other three sides of the square. The primary coils are wound on the arms or on the rims, as preferred, and the secondary coils may be wound on either or on both. If the primary coils be wound, for instance, on the rims, secondary coils may be wound on both the spokes and rims and will then give an eight-phase current; but as the flux in each spoke will be the resultant of two fluxes ninety degrees from each other it will be equal, as is obvious from geometry, to the square root of two times the flux in the rims. Therefore the secondary coils on the rims should have a number of turns equal to the square root of two times the number of turns in the coils on the spokes.

The angle which any particular side of the square makes with the line P Q is not important, and the result is that a large number of transformers may be wound with a different proportion in the primary coils to give the same result. Fig. 9 shows how two such transformers may be wound to give sixteen-phase current from four-phase. The diagram is the same, but there are two squares displaced from each other by one-sixteenth of a circle. It is thus evident that by winding two transformers like that shown in Fig. 4 with the windings indicated by the set of lines $m\,o,\ o\,n$ and $m'\,o',\ o'\,n'$, respectively, a sixteen-phase current will be obtained in the secondaries.

Figs. 10 and 20 show the connections for a four-link transformer designed to give eight-phase current in the secondary. The primary windings (not shown) are supposed to be four-phase and may be wound on the arms or on the rims, as preferred. The magnetic fluxes in the arms will be four-phase—that is to say, ninety degrees from each other—and represented by the sides of the square $h\,b\,d\,f$. Inscribe in the square the octagon $h\,a\,b$, &c., of which every other angle coincides with one angle of the square. Draw the perpendiculars $a\,i,\ c\,j$, &c. Then the sides of the octagon will represent the eight-phase system required. Any side of the octagon, as $a\,b$, is the resultant of two perpendicular lines, as $a\,i$ and $i\,b$. Then if we wind on one of the arms of the transformer of Fig. 20 the coil $a\,i$ and connect it in series with the coil $i\,b$ of the next adjacent spoke the electromotive force from $a$ to $b$ will correspond to the side $a\,b$ of the octagon in Fig. 10. In the same way the other sides of the octagon are produced, and the currents taken off at $a\,b\,c\,d\,e\,f\,g\,h$ are eight-phase currents.

Figs. 12 and 13 are similar and will readily be understood.

Fig. 19 shows the method of obtaining an eight-phase current from a four-phase current by the use of two simple transformers and corresponds also with Fig. 10. E and E' are the two primaries whose currents are displaced from each other by ninety degrees. $a\,b\,c$, &c., are the secondary terminals. The windings will be obvious from a comparison with the diagram. The principle is the same as before—that is to say, each of the eight-phase currents is the resultant of the two quarter-phase currents taken of the proper magnitude and direction.

Figs. 14 and 15 show how the two sets of polyphase electromotive forces $A'\,B'\,A'\,E'$ and $A^2\,B^2\,A^2\,E^2$ may be obtained from the four-phase electromotive forces $A'\,C'\,A'\,D'$. It will be noted that this is accomplished in the manner above explained by suitably choosing the lengths of the lines $A'\,C',\ A'\,D',\ A^2\,C^2,\ A^2\,D^2$, &c., and that the two resulting systems are intermediate in phase.

In Fig. 16 is shown a four-link transformer wound with two closed windings of eight coils each. With this transformer many combinations may be produced. If four-phase current (ordinarily two-phase) be introduced into one set of coils on the spokes, as by the pair of terminals 8 1, 2 3, 4 5, and 6 7, four-phase current of different voltage may be collected from the pairs of terminals 16 9, 10 11, 12 13, and 14 15 and also from the sets of terminals 16 11, 10 13, 12 15, and 4 9, while from the whole set of terminals 9, 10, 11, 12, 13, 14, 15, and 16 eight-phase currents may be taken off. It is therefore evident that from a link-transformer having a plurality of magnetic phases a secondary current of any desired number of phases may be obtained in many varieties of ways.

By the well-known principle of transformers the windings above described as secondary may be used for the primary, and vice versa.

G, Figs. 17 and 18, represents the conductors, leading from a source of polyphase current and connected each to a bar $h'$ of the stationary commutator H, Fig. 17, or to the brush V, Fig. 18.

K K are brushes rubbing on the commutator H.

N, Fig. 17, represents two metallic rings insulated from each other and from the supporting-shaft W and each joined by a conductor of electricity to one of the brushes K.

O represents brushes rubbing on the rings N and connected to the conductors of electricity P, from which a continuous current is obtained.

Q represents two metallic rings insulated from each other and from the shaft W and joined by conductors of electricity to the windings of the armature T. More than two rings Q may be employed, if desired.

L represents the armature of a synchronous motor.

R represents a pair of brushes rubbing on the rings Q and joined to the conductors of electricity S, through which the current is supplied to the armature L. The number of brushes R must correspond with the number of rings Q if more than two be employed.

U represents a plurality of metallic rings insulated from each other and from the supporting-shaft X and each joined by a conductor of electricity to a bar of the commutator H.

V represents metallic brushes rubbing on the rings U and joined to the conductors of electricity G.

Y represents an ordinary drum-armature or the armature of a synchronous motor; but the same connections may be made with revolving field-magnets.

In order to produce a continuous current from a polyphase current, a recourse is had to the apparatus shown in Figs. 17 and 18. If in Fig. 17 the conductors G are connected to a source of polyphase current and the brushes K are caused to revolve by the armature T of a synchronous motor, then when the armature and brushes are revolving in synchronism with the current a continuous current can be taken off from the brushes O. Current is supplied to the armature through the brushes R and the rings Q and may be derived from the original polyphase current or from special coils on one of the main transformers altogether. The field-coils of the motor may be excited by any of the known means. In Fig. 18 the brushes K are fixed and the commutator revolves with the armature, to which it is rigidly secured. The commutator-bars are joined to the source of polyphase current through the rings E, brushes V, and conductors G. The armature-coils may be connected to some or all of the commutator-bars or may be supplied through a separate set of rings connected either directly or through transformers to the main current.

It is evident that if the number of bars on the commutator is two, three, and four or more times the number of phases of the current then the armature need only revolve one-half, one-third, one-fourth, &c., times as fast. It is also evident that both the commutator and brushes may revolve and that a continuous current will be obtained from the brushes K when the difference in speed is in synchronism with the current.

When the difference of speed of the two parts is not in synchronism with the current, an alternating current of a different frequency will be obtained.

There are so many ways of revolving the commutator or brushes in synchronism with the current that I cannot mention all. However, the method of stationary commutators and brushes revolved by connection with the revolving magnets and a stationary armature having alternating currents conveyed to it either directly from the fixed commutator or from separate coils on the transformer or from a separate transformer entirely seems to me to offer the fewest moving connections. It is also to be noted that transformers with only one or two limbs may be used in the same manner as one with a greater number.

In Fig. 21, $E^2$ $E^3$ are two transformers, each provided with five magnetic paths, as shown, joined together at the ends, as in the forms described above. Two phase currents, of phase-angles represented by the two arrows, enter and pass to the coils $e'$ $e^3$ and $e^2$ $e^4$, respectively. The secondary coils $f'$ $f^2$ to $f^5$ of the transformer $E^2$ are connected in a closed circuit alternately with the corresponding coils $f^6$ $f^7$ to $f^{10}$ of the transformer $E^3$, so that the order of the coils in the closed circuit is $f'$ $f^6$ $f^2$ $f^7$ $f^3$ $f^8$ $f^4$ $f^9$ $f^5$ $f^{10}$ $f'$. The primary coils $e'$ $e^2$ $e^3$ $e^4$ are so wound in accordance with the principles above explained as to produce in the magnetic circuits of $E^2$ a set of five-phase magnetomotive forces and in the magnetic circuits of $E^2$ a second set of five-phase magnetomotive forces displaced by 0.1 of a period, or thirty-six degrees in time, from the magnetomotive forces of the first set. The result is to generate in the secondary coils two sets of five-phase electromotive force such that the series of phases produced by each of the transformers falls between those produced by the other, so as to form a single set of ten-phase electromotive forces. Leads G' G' pass from the connections between the various coils $f'$ $f^6$, &c., to a commutator H', on which bear brushes K' K', connected, as shown, to rings J', and thus through brushes O' to an external circuit. With this arrangement by revolving the commutator at a proper speed two-phase alternating currents may be converted into continuous current, or vice versa.

In this specification and in the claims thereto annexed the action of the transformer-lag has been neglected, as the effect is the same for all secondary coils, and I have considered the question as if the current in the secondary of an ordinary transformer were in phase with that in its primary.

Having thus described my invention, what I claim, and desire to secure by Letters Patent of the United States, is—

1. The method of changing alternating current to direct, which consists in setting up by the alternating currents, dephased magnetomotive forces, superposing said magnetomotive forces, and producing thereby electromotive forces of a number of phases greater than that of the original alternating current and commutating the current resulting from said magnetomotive forces, substantially as described.

2. The method of changing alternating current to direct, which consists in setting up by means of the alternating current dephased magnetomotive forces in a link-transformer, superposing the magnetic fluxes resulting from said magnetomotive forces, and commutating the current induced by said magnetic fluxes, substantially as described.

3. The method of changing the number of phases of alternating currents, which consists in generating dephased magnetic fluxes by said alternating currents, superposing said fluxes, generating thereby dephased electromotive forces, and taking off currents due to electromotive forces, one or more of which is the resultant of two or more of the above-mentioned dephased electromotive forces, substantially as described.

4. A link-transformer having a plurality of magnetic circuits, a set of primary coils and a set of secondary coils, some coils in one of said sets being wound on parts of the core common to two magnetic circuits and some on parts not common to them, in combination with a commutating apparatus connected to said secondary coils, substantially as described.

5. The combination with a source of electricity, of a link-transformer having a plurality of magnetic circuits, conductors of electricity connecting said source of electricity with said transformer and a plurality of primary coils wound on the parts of the core common to two magnetic circuits, and the parts not common to them, so as to produce a plurality of magnetic phases, substantially as described.

6. The combination with a source of electricity of a link-transformer having a plurality of magnetic circuits, conductors of electricity connecting said source of electricity with said transformer, and a plurality of primary coils wound on the parts of the core common to two adjacent magnetic circuits so as to produce a plurality of magnetic phases, and a plurality of secondary coils wound on both the parts of the core common to two magnetic circuits, and the parts not common to them, and connected so as to produce a plurality of phases in the secondary circuit, substantially as described.

7. The combination with a source of electricity of a link-transformer having a plurality of magnetic circuits, conductors of electricity connecting said source of electricity with said transformer and a plurality of primary coils wound both on the parts of the core common to two magnetic circuits and the parts not common to them, so as to produce a plurality of magnetic phases, and a plurality of secondary coils wound on the said transformer and connected so as to produce a plurality of phases in the secondary circuit, substantially as described.

8. The combination with a source of electricity of a link-transformer having a plurality of magnetic circuits, conductors of electricity connecting said source of electricity with said transformer and a plurality of primary coils wound both on the parts of the core common to two magnetic circuits, and the parts not common to them, so as to produce a plurality of magnetic phases, and a plurality of secondary coils wound both on the parts of the core common to two magnetic circuits, and the parts not common to them, and connected so as to produce a plurality of phases in the secondary circuit, substantially as described.

9. The combination with a source of electricity, of a plurality of transformers, each having a plurality of magnetic circuits, conductors of electricity connecting said source of electricity with said transformers, a plurality of primary coils wound on said transformers so as to produce a plurality of magnetic phases in each, the series of magnetic phases produced by any one transformer falling between those produced by the other, so as to form a complete cycle, substantially as described.

10. The combination with a source of electricity, of a plurality of transformers, each having a plurality of magnetic circuits, conductors of electricity connecting said source of electricity with said transformers, a plurality of primary coils wound on said transformers so as to produce a plurality of magnetic phases in each, the series of phases produced by each transformer falling between those produced by the others, so as to form a complete cycle, and a plurality of secondary coils wound on the magnetic circuits of said transformers, the said secondary coils being connected in such a manner as to produce a greater number of phases in the secondary current than exists in the electromotive force exerted on said secondary coils by the iron of said transformer, substantially as described.

11. The combination with a source of electricity, of a plurality of transformers, each having a plurality of magnetic circuits, conductors of electricity connecting said source of electricity with said transformers, a plurality of primary coils wound on said transformer so as to produce a plurality of magnetic phases in each, the series of phases produced by each one of the transformers falling between those produced by the other, so as to form a complete cycle, and a synchronous commutator connected to said transformer, substantially as described.

12. The combination with a source of electricity, of a plurality of transformers, each having a plurality of magnetic circuits, conductors of electricity connecting said source of electricity with said transformers, a plurality of primary coils wound on said transformer so as to produce a plurality of magnetic phases in each, the series of phases produced by each one of the transformers falling between those produced by the other, so as to form a complete cycle, a plurality of secondary coils wound on the magnetic circuits of said transformers, the said secondary coils being connected in such a manner as to produce a greater number of phases in the secondary current than exists in the electromotive forces exerted on said secondary coils by the iron of said transformers, and a synchronous commutator connected to said transformers, substantially as described.

In testimony whereof I affix my signature in presence of two witnesses.

HENRY A. ROWLAND.

Witnesses:
VERNON MASGATT,
H. H. ROWLAND.